United States Patent

Yamamuro

Patent Number: 5,230,410
Date of Patent: Jul. 27, 1993

[54] PEDAL PARKING BRAKE DEVICE
[75] Inventor: Kouichi Yamamuro, Nagano, Japan
[73] Assignee: NHK Spring Co., Ltd., Kanagawa, Japan
[21] Appl. No.: 770,031
[22] Filed: Oct. 4, 1991
[30] Foreign Application Priority Data Oct. 4, 1990 [JP] Japan .............................. 2-104729[U]
Dec. 22, 1990 [JP] Japan .............................. 2-404263[U]

[51] Int. Cl.⁵ .................................................. B60T 7/06
[52] U.S. Cl. .................................... 192/8 C; 403/213
[58] Field of Search ............... 192/8 C; 74/531, 502.4, 74/502.6; 185/45; 403/209, 213

[56] References Cited

U.S. PATENT DOCUMENTS

| | | | |
|---|---|---|---|
| 707,624 | 8/1902 | Niles | 403/213 |
| 1,758,948 | 5/1930 | Helm | 403/209 X |
| 1,914,510 | 6/1933 | Johnson et al. | 192/8 C X |
| 3,426,613 | 2/1969 | Conrad | 74/502.4 |
| 3,513,719 | 5/1970 | Tschanz | 74/502.6 |

FOREIGN PATENT DOCUMENTS

| | | | |
|---|---|---|---|
| 67915 | 9/1946 | Denmark | 403/209 |
| 537417 | 5/1922 | France | 403/209 |
| 5683 | of 1894 | United Kingdom | 403/209 |

Primary Examiner—Rodney H. Bonck
Attorney, Agent, or Firm—Keck, Mahin & Cate

[57] ABSTRACT

A pedal parking brake device comprising a rotation lock of the brake pedal including a coil spring having a hook portion. The coil spring is outwardly inserted to a core bar positioned at the rotatably supporting portion of the brake pedal in closely contact state, one end of the hook portion of the coil spring is attached to a base side, while another end abuts against a lock releasing member.

4 Claims, 3 Drawing Sheets

PEDAL PARKING BRAKE DEVICE

BACKGROUND OF THE INVENTION

This invention relates to a pedal parking brake device which actuates a parking brake of wheels of a car or the like and performs the release thereof.

Recently, a pedal parking brake device equipped with an automatic change gear was used in place of a side brake which performs a parking brake by hand. This pedal parking brake device which is shown in FIGS. 12 to 14, when a brake pedal 10 is stepped on, a diameter of a coil spring 11 wound in closely contact state around a core bar positioned at a pivotally supporting portion of the brake pedal 10 integrated therewith is enlarged, whereby brake pedal 10 pivots together with core bar. By this, a brake cable 12 connected with brake pedal 10 is pulled thereby causing a braked state in a brake body (now shown).

When the foot is removed from the brake pedal 10 in this state, a force adapted to return the brake pedal 10 to an original positions acts by a return spring (not shown) of the brake body side. However, since this force acts in a direction to reduce the diameter of the coil spring 11 of the core bar, the rotation of the brake pedal 10 is locked to maintain a braked state. The release of the brake is performed by enlarging the diameter of the coil spring 11 by pulling a release cable 13 via a lock-removing member 14. In other words, when the diameter of the coil spring 11 of the core bar is enlarged, the brake pedal 10 returns to the original position by the action of the return spring of the brake body whereby the parking brake is released.

In this case, a hook portion 11a at one end of the coil spring 11 is latched around a pin 16 in a U-type fixed to a base 15 fixed to the car body.

However, in a conventional art, when the load of the brake increases, the hook portion 11a having a U-type design is pulled to the coil side (see two-dot chain line in FIG. 14), causing the lock to loosen. For this reason, there exists a need in the art to make a brake which can be maintained at high loads.

Further, when the brake pedal 10 is stepped on, the U-type hook portion 11a of the coil spring 11 moves so that the pin 16 slips out. So far it has not been possible to control the movement of the coil spring. Consequently, when the U-type hook portion 11a moves, the lock of the brake pedal decreases.

In other words, the prior art lacks the ability to control the play between the U-type hook portion 11a of the spring 11 and the pin 16.

The present invention is designed to overcome this prior art problem.

SUMMARY OF THE INVENTION

An object of the present invention is to provide a pedal parking brake device which maintains a high load brake by preventing the decrease of the lock of the brake pedal.

A pedal parking brake device comprises a rotation lock including a coil spring having a hook portion at one end. The coil spring is wound in close contact state around a core bar positioned at a supporting portion of a brake pedal. One end of a hook portion of the coil spring is latched with a pin at base side and the other end is abutted against a lock releasing member. The end of hook portion of the coil spring is surrounded with a fixed member fixed to the base side.

Consequently, since the hook portion is surrounded by the fixed member fixed to the pin at the base side, the transformation and the movement of the hook portion are prevented, and the play does not occur between the hook portion and the pin. Thus, preventing a loosening of the lock of the brake pedal, and consequently, maintaining the brake of high loads.

DETAILED DESCRIPTION OF THE INVENTION

In FIG. 1 to FIG. 11, where the element of the embodiment of the present invention is the same as in the prior art device, the same reference number is used.

Figure 1:
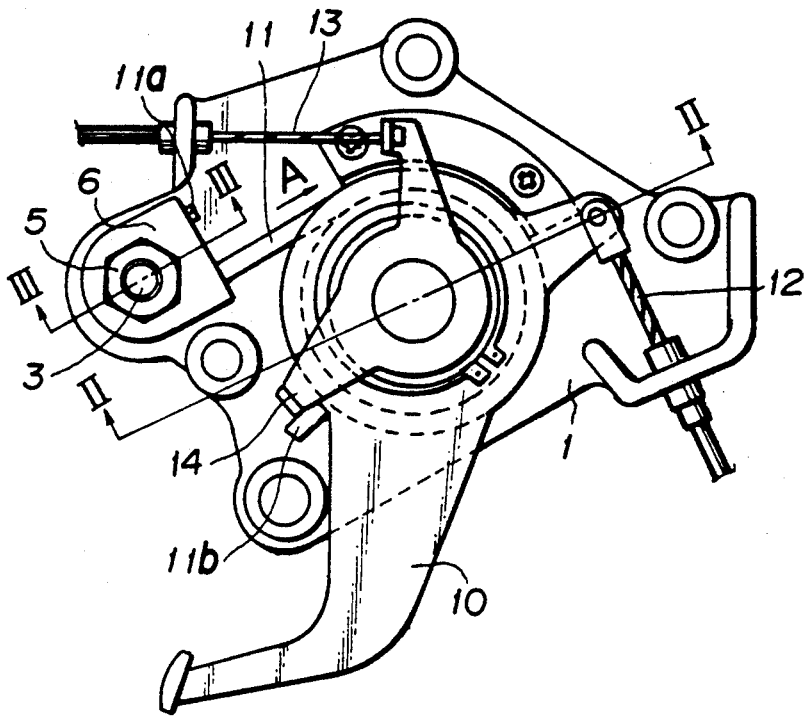
FIG. 1 is a plan view of a first embodiment of this invention.
Figure 2:
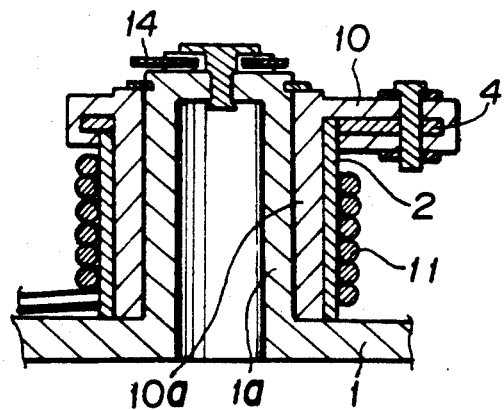
FIGS. 2 and 3 are sectional views taken along line II—II and line III—III in FIG. 1 respectively.

In FIG. 1 and FIG. 2, an approximately central portion of the base 1 fixed to the car body is formed to be a cylinder having a bottom portion, an upper portion, a cylindrical portion 1a therebetween. The cylindrical portion is pivotally surrounded with brake pedal 10 made of synthetic resin. Around the outer circumference of the cylindrical portion 10a of the brake pedal 10, a cylindrical core bar 2 made of metal is provided.

At the outer circumference of the core bar 2, a coil spring 11 is provided to wind it in a contact state. The coil spring 11 is provided at one end with a hook portion 11a which is latched to a pin 3 fixed with pressure to the base 1, while the other end 11b of the coil spring 11 is abutted against one end of the lock releasing member 14. The other end of lock releasing member 14 is connected to a release cable 13, said lock releasing member 14 is provided rotatably to the bottom of the cylinder portion 1a as shown in FIG. 2.

A metallic plate 4 having a connecting hole connected with a brake cable 12 at the top end thereof is connected to the upper portion of the core bar 2 through a latching portion. The core bar 2 and the plate 4 may be inserted into the brake pedal 10.

One end of the brake cable 12 is connected to the brake pedal 10 by latching with a pin provided through a hole for connecting the plate 4 (please see FIGS. 1 and 2).

Figure 3:
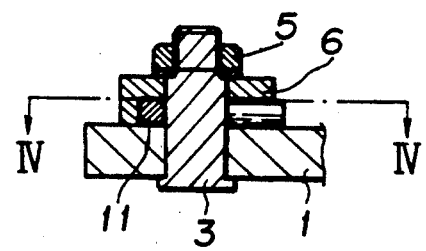

The U-type hook portion 11a of the coil spring 11 hooks around pin 3 which is inserted through base 1 and held by pressure. The U-type hook portion 11a is surrounded by a fixed member 6 which is attached to pin 3 with nut 5 as shown in FIGS. 3 and 4.

Figure 4:
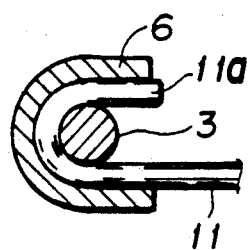
FIG. 4 is a sectional view taken along line IV—IV in FIG. 3.

Fixed member 6 is formed having a side wall with a U-type form corresponding to the outer portion of hook portion 11a as shown in FIG. 4.

Using the above-description of the invention, when the brake pedal 10 is stepped on, it moves in a counter-clockwise direction, the diameter of the coil spring 11 is enlarged (unwinding), and the core bar 2 and the plate 4 rotate with the brake pedal 10. As a result, the brake cable 12 is pulled and the brake is applied. When the foot is removed from the brake pedal 10 after applying the brake, a force returns the brake pedal 10 to an original position operates by the action of the return spring of the brake body. However, the force in this direction is one which reduces the diameter of the coil spring 11 (winding) and the rotation of the core bar 2 is locked by strongly winding the coil spring 11. When the rotation of the core bar 2 is locked, the rotation of the plate 4 is also locked and the drawn-out brake cable 12 stops at the position thereof as it is, thereby being able to maintain a brake applying state.

Figure 14:
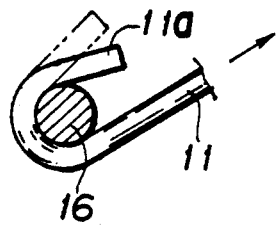
FIG. 14 is a sectional view taken along line XIV—XIV in FIG. 13.

At the same time, when the foot is removed from the pedal 10 after stepping, a force in A direction (FIG. 1) is applied to the hook portion 11a of the coil spring 11. By this, the hook portion 11a is transformed to a form as shown in a two-dot chain line of FIG. 14 described in the prior art. However, since the hook portion 11a is enclosed by the fixed member 6 (when the form of the hook portion 11a has rather an opened form than the form of the fixed member 6, the hook portion 11a is reformed by side wall of the fixed member 6). Thus, the transformation of the hook portion 11a does not occur. Further, when the brake pedal 10 is stepped on, the hook portion 11a is apt to move in the opposite direction against A direction (a direction drawn out from pin 3), but with the present invention, the hook portion 11a does not move because it is surrounded with the fixed member 6.

Accordingly, the brake pedal is locked instantaneously and the brake operates efficiently.

The releasing of the parking brake may be performed by rotating the lock releasing member 14, pulling the release cable 13 and moving the hook portion 11b of the other end of the coil spring 11, thereby enlarging the diameter of the coil spring 11. In other words, when the diameter of the coil spring 11 is enlarged, the lock of the core bar 2 by coil spring 11 is released and the brake pedal 10 is returned to the original position by the action of the return spring of the brake body whereby the parking brake is released.

Figure 5:
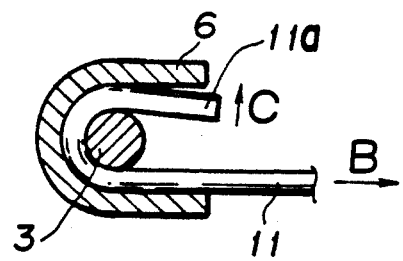
FIG. 5 is a sectional view correspondent to FIG. 4.
Figure 6:
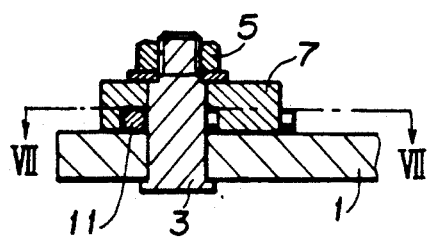
FIG. 6 is a sectional view of a second embodiment of this invention co respondent to FIG. 3.
Figure 7:
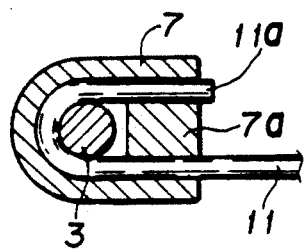
FIG. 7 is a sectional view taken along line VII—VII in FIG. 6.

FIG. 6 and FIG. 7 illustrate another embodiment of this invention. When the hook portion 11a of the coil spring 11 is strongly bent, and there occurs a clearance between the fixed member 6 and the hook portion 11a as shown in FIG. 5, the hook portion 11a moves in C direction until the clearance disappears if a force is applied in B direction. By this, the hook portion 11a moves in B direction.

To remedy this problem, a fixed member 7 shown in FIG. 6 and FIG. 7 is formed so as to have a side wall having an approximately U-type form corresponding to outer portion of the hook portion 11a and a protruding portion 7a which pinches the released end of the hook portion 11a to the side wall, thereby removing the clearance between the fixed member 7 and the hook portion 11a. With the removal of the clearance and the stoppage of the movement of the hook portion 11a, the brake pedal 10 locks instantaneously, thereby being able to maintain the brake at a high load.

Further, when the rotation force of the core bar 2 in D direction becomes larger, the fixed member 6 rotates in E direction together with the hook portion. By this, F portion of the lock spring 11 transforms to a bending form. This transformation enlarges the play at the time of locking, which causes a breakage of the lock spring 11. This is the same with respect to the fixed member 7.

Figure 9:
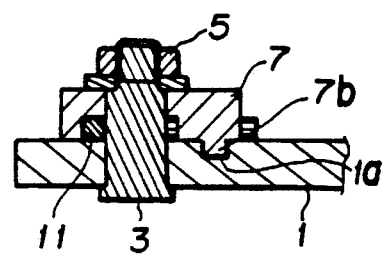
FIG. 9 is a sectional view of the third embodiment of this invention correspondent to FIG. 6.

For this purpose, the movement of fixed member 7 is prevented with projection 7b attached to fixed member 7 and with a hole 1a in base 1 in which the fixed member 7 is inserted as shown in FIG. 9, as a third embodiment.

Figure 10:
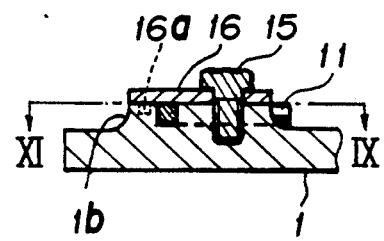
FIG. 10 is a sectional view of a fourth embodiment of this invention correspondent to FIG. 9.
Figure 8:
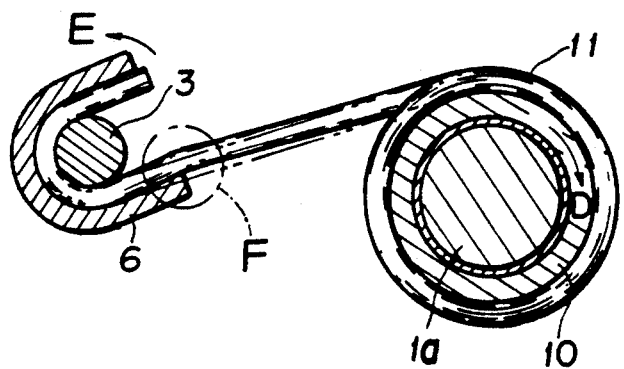
FIG. 8 is a sectional explanation view of a third embodiment of this invention.
Figure 11:
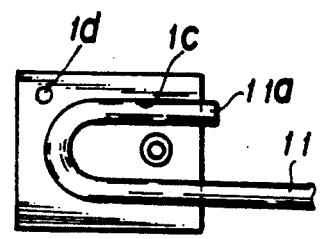
FIG. 11 is a sectional view taken along line XI—XI of FIG. 10.
Figure 12:
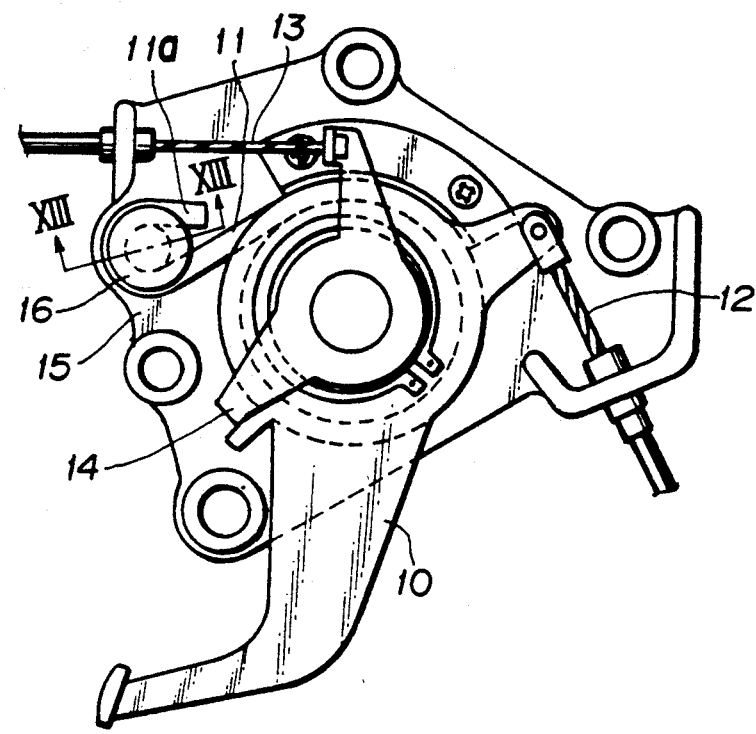
FIG. 12 is a plan view of a conventional art.
Figure 13:
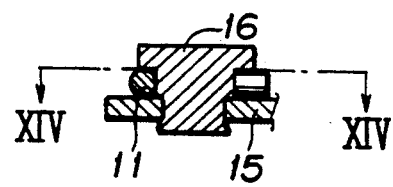
FIG. 13 a sectional view taken along line XIII—XIII in FIG. 12.

Further, as shown in FIG. 10 and FIG. 11, as a fourth embodiment, base 1 is provided with a convex step portion 1b and a U-type groove 1c formed at the convex step portion 1b. The hook portion 11a of the lock spring 11 is inserted through this U-type groove 1c. The U-type groove 1c is formed so as to correspond to the outer form of the hook portion 11a.

With this embodiment, since the hook portion 11a is enclosed with U-type groove 1c, the transformation and the movement of the hook portion 11a are eliminated.

In this embodiment, a cover member 16 clamped with a screw 15 is provided with a latching projection 16a with a half cut and a latching hole 1d provided at the concave step portion 1b of the base 1, thereby strengthening a clamp so as to stop the rotation of the cover member 16 by latching the latching projection 16a and the latching hole 1d.

In the fourth embodiment, of course the hook portion 11a of the coil spring 11 does not transform even if any force may apply to the coil spring.

As described above, according to this invention, since the hook portion does not transform, the brake does not loosen upon the return of the brake pedal. Further, since the movement of the hook portion can be prevented when brake pedal is stepped on, this also prevents the brake from loosening upon return of the brake pedal.

Furthermore, even if the form of the hook portion disperses somewhat, the movement of the hook portion can be prevented, since the dispersion is corrected by the fixed member as a fixed portion.

What I claim is:

1. A pedal parking brake device, comprising a coil spring wound closely around a core bar positioned at a supporting portion of a brake pedal, a hooked end portion of the coil spring being attached with a pin at a base portion and another end thereof being abutted against a lock releasing member whereby a rotation lock of the brake pedal is performed, and a fixed member surrounding the hooked end portion which is fixed to a pin at the base portion, wherein the fixed member is formed so as to have at least an approximately U-shaped side wall corresponding to an outer form of the hooked end portion of the coil spring.

2. A pedal parking brake device according to claim 1 wherein the fixed member further comprising a protruding portion which pinches the hooked end portion to the side wall.

3. A pedal parking brake device according to claim 2 wherein the fixed member further comprises a latching projection adapted to stop the rotation of the fixed member latching with the base portion.

4. A pedal parking brake device according to claim 1 wherein the fixed member is a groove formed at a convex step portion of the base portion, said groove being formed to be an approximately U-type corresponding to an outer form of the hook portion of the coil spring.

* * * * *